United States Patent [19]
Mihirogi

[11] 4,280,412
[45] Jul. 28, 1981

[54] INDEPENDENT SUSPENSION SYSTEM FOR ATTRACTION TYPE MAGNETICALLY FLOATED TRAVELLING BODY

[75] Inventor: Kiyoshi Mihirogi, Odawara, Japan
[73] Assignee: Japan Air Lines Co., Ltd., Tokyo, Japan
[21] Appl. No.: 68,957
[22] Filed: Aug. 22, 1979

[30] Foreign Application Priority Data
Aug. 24, 1978 [JP] Japan .................. 53-103296

[51] Int. Cl.³ .................................. B61B 13/08
[52] U.S. Cl. ........................ 104/281; 104/23 FS; 104/291
[58] Field of Search ................ 104/281–284, 104/290, 291, 293, 23 FS; 267/3; 105/197 B, 199 CB

[56] References Cited
U.S. PATENT DOCUMENTS 3,618,529 11/1971 Bertin ...................... 104/290 X
4,029,020 6/1977 Nakamura et al. .......... 104/291 X

FOREIGN PATENT DOCUMENTS 1152438 8/1963 Fed. Rep. of Germany ........... 267/3
2111184 9/1971 Fed. Rep. of Germany ........... 267/3

Primary Examiner—Randolph A. Reese
Attorney, Agent, or Firm—Wenderoth, Lind & Ponack

[57] ABSTRACT

An independent suspension system is provided for an attraction type magnetically floated travelling body wherein plural modules, each of which is obtained by assembling one or a plurality of electromagnets in combination with a brack and a linear motor, are attached to the travelling body in continuous alignment to confront each of a pair of rails. Each of the modules is connected to the travelling body in such a way as to be movable relative to the travelling body. The suspension system includes a pair of air springs which are separately arranged between the travelling body and each module and are disposed in the front and rear parts of the module to support the weight of the travelling body and to perform a buffering action, two thrust links extending from front and rear pivotal connection points on the module to be pivotally connected to a mounting member provided on the travelling body, and mounting members which are provided for connecting the air springs and the thrust links to the travelling body, each of the mounting members being arranged to be freely movable to a given extent for improvement of the capability of the module to follow the rail.

5 Claims, 10 Drawing Figures

INDEPENDENT SUSPENSION SYSTEM FOR ATTRACTION TYPE MAGNETICALLY FLOATED TRAVELLING BODY

BACKGROUND OF THE INVENTION

1. Field of the Invention

This invention relates to a suspension system for an attraction type magnetically floated travelling body.

2. Description of the Prior Art

An attraction type magnetically floated travelling body is arranged to be floated in the air by attraction forces of electromagnets exerted on rails and then is caused to travel by a propelling means such as a linear motor with a floating gap of about 10 mm maintained along the rails. The floating gap is extremely small. This means that, where the travelling body is arranged to travel at a high speed of 70 to 80 meters/sec. or thereabout, thorough consideration is required for maintaining the above stated amount of gap unvaried. There has previously been developed an independent suspension system in which electromagnets are attached to a travelling body through a secondary suspension arrangement. In this system, many electromagnets to be attached to the travelling body are divided into a number of groups. Each group is firmly assembled into an independent module (or an assembled unit structural body) independently of other groups and the module is attached to the travelling body through the secondary suspension arrangement. Compared with the so-called fixed suspension system, the module arrangement makes each of the modules mobile independently of the travelling body and imparts an improved capability for following the rail to each electromagnet to lower the degree of dependency upon the precision required in laying the rails, i.e. precision in carrying out the laying, maintenance and inspection work on the rails is required to a less degree. Besides, with this system employed, the travelling body becomes more comfortable to ride on, because the movement of the electromagnets, such as vibration of the electromagnets in following warped parts of the rails, is not directly transmitted to the travelling body. The present invention is directed to an improvement on this suspension system.

SUMMARY OF THE INVENTION

It is a general object of this invention to provide an independent suspension system using the above stated module arrangement and being provided with a buffer device which is interposed between a travelling body and each module to support the weight of the travelling body and to mitigate impacts and also which is provided with a propulsion transmitting device which transmits a propulsive force and a braking force.

In accordance with this invention, a pair of air springs which are employed as buffer devices are disposed on the front and rear parts of each module. The lower end of each air spring is immovably attached to the module while the upper end thereof is arranged to be movable relative to the travelling body in the left and right directions to a given extent. Further, in order that the propulsive force and the braking force produced by the linear motor and a brake which are included as components in each module are transmitted to the travelling body, the propulsion transmitting device is provided with two thrust links which symmetrically extend from front and rear pivotal connection points with the module to form a reversed V shape and are thus pivotally connected to a mounting member provided on the side of the travelling body, with the mounting member being arranged to be freely movable right and left to a given extent.

The two thrust links which constitute the propulsion transmitting device are arranged to normally form an isosceles triangle with these links in the position of the two equal sides thereof within a horizontal plane in such a way as to permit the vertical movement of the module. Further, with the intersection of the axes of the two links arranged to be located above the center line of the rail, yawing that is caused by the propulsive force of the linear motor or the braking force of the brake can be reduced to a minimal degree.

The above and further objects and novel features of the invention will more fully appear from the following detailed description when the same is read in connection with the accompanying drawings, which show an embodiment of the invention.

DETAILED DESCRIPTION OF PREFERRED EMBODIMENT

Figure 1:
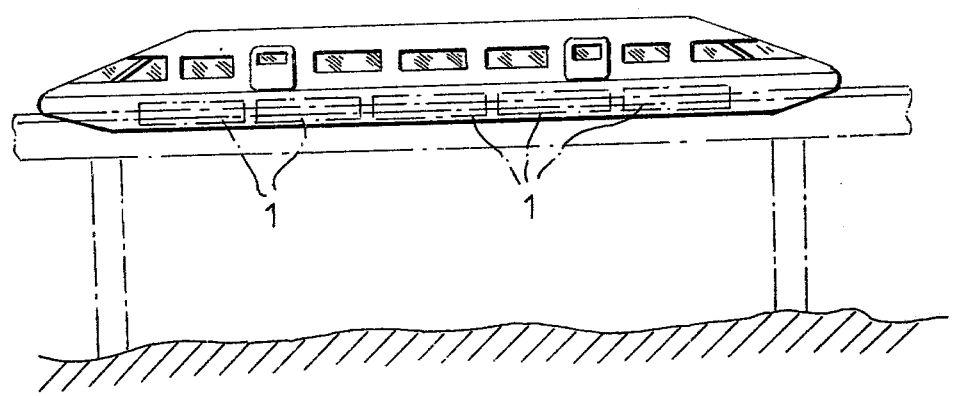
FIG. 1 is an elevation view showing an attraction type magnetically floated travelling body.
Figure 2:
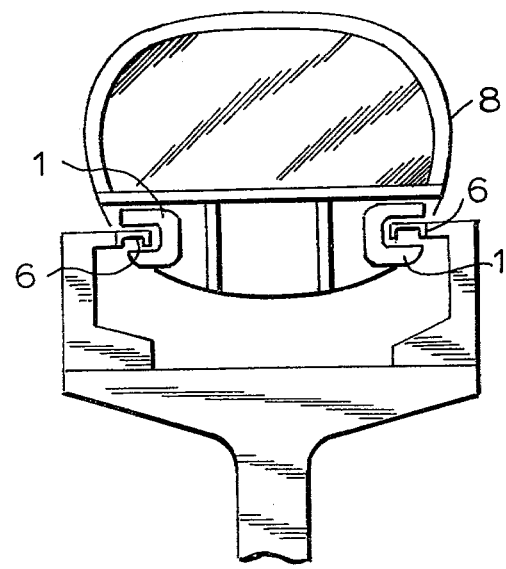
FIG. 2 is a cross sectional front view showing the same travelling body.
Figure 3:
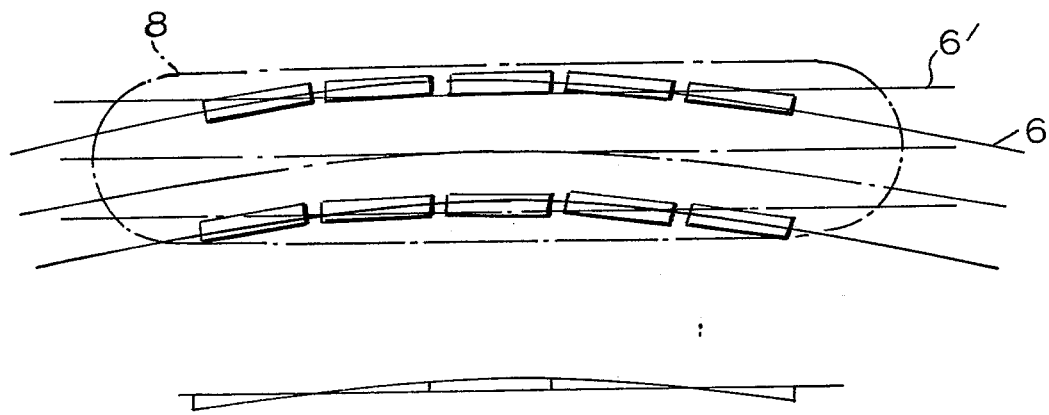
FIG. 3 is a schematic illustration showing the necessity of allowing the module some latitude in rotational movement relative to the travelling body.

Referring to the accompanying drawings, each of a plurality of modules 1 has an approximately C-shaped sectional configuration. Four electromagnets 4 are secured to the lower arm 2 of the module and are in a continuous alignment, while a linear motor 5 is secured to the upper arm 3 of the module 1. A rail 6 which is laid on the ground and a reaction plate 7 are positioned between the upper and lower arms of the module 1. The module is lifted up to float with the module attracted toward the rail and the reaction plate by virtue of the electromagnets 4, and then the linear motor 5 imparts a propulsive force to the module in the direction of the rail. The floating and propulsive forces imparted to the module are transmitted to a travelling body 8 through an independent suspension system. However, in view of the peculiarity of the attraction type magnetically floated travelling body as described in the foregoing, the known suspension systems such as those used for rolling stock, motor vehicles, etc. can not be used for an attraction type magnetically floated travelling body. In the case of a travelling body of this type, it is desired to make the sectional area of the rail as small as possible for reduction of cost of construction. To meet the above stated requirement with a certain floating force ensured, the travelling body must be provided with a large number of electromagnets which are arranged to confront the rails and which are continuously arranged without leaving gaps between adjacent electromagnets. Consideration will not be made of the movement of the module 1 which is obtained by assembling a plurality of these electromagnets. When the travelling body 8 is positioned on a curved portion of track as shown in FIG. 3, in order to have each of the modules 1 follow a curved rail 6, the module 1 must be allowed to be displaced in left and right (lateral) directions relative to the travelling body and also to be rotationally displaced within a horizontal plane.

Figure 4:
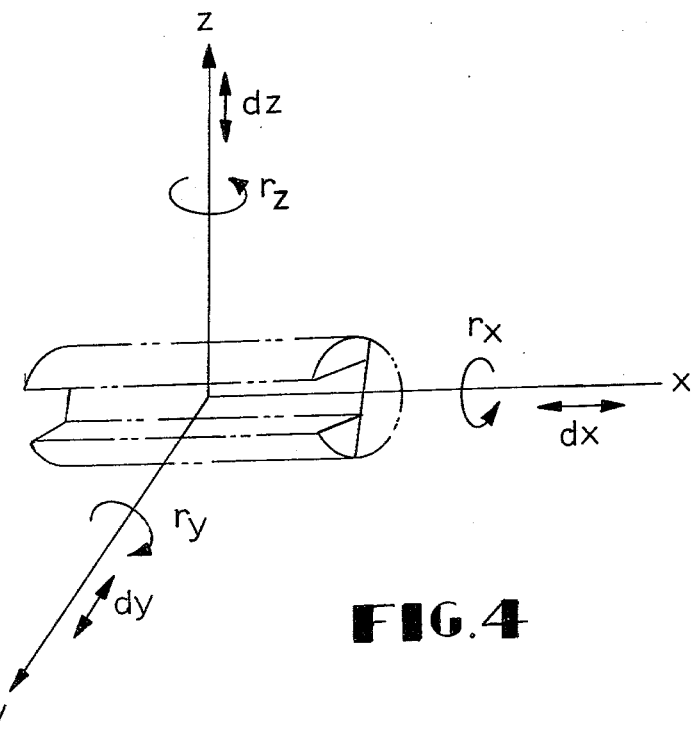
FIG. 4 is an illustration showing the spatial movement of each module.
Figure 5:
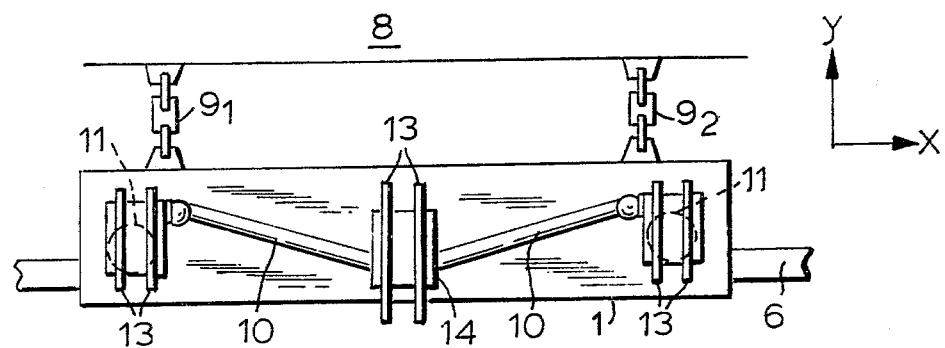
FIG. 5 is a plan view showing an independent suspension system according to an embodiment of the invention.
Figure 6:
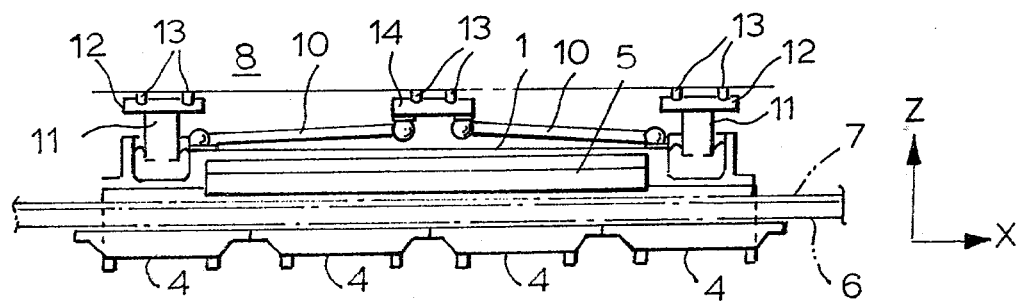
FIG. 6 is a side view showing the same suspension system.
Figure 7:
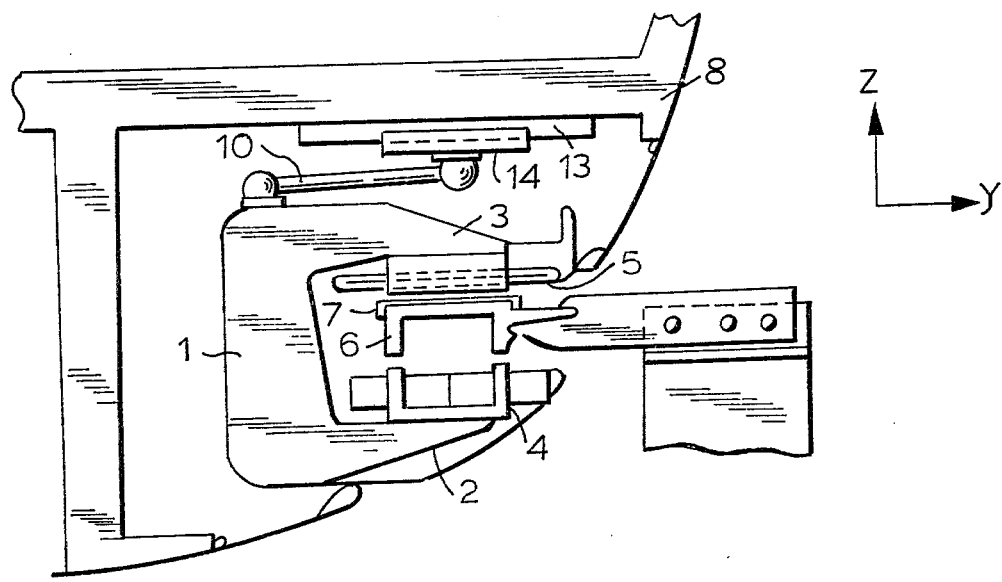
FIG. 7 is a front view of the same.

Taking the upward and downward displacements of the rails 6 also into consideration, it is assumed that the forward and backward directions (direction of the track), left and right directions (lateral direction) and the upward and downward directions (vertical direction) of the travelling body 8 are axes x, y and z as shown in FIG. 4, the module 1 must be permitted to make movements dy and dz in the directions of the axes y and z and rotational movements ry and rz about the axes y and z. On the other hand, the movement dx of the module 1 in the direction of the axis x must be controlled for transmission of a propulsive force while the rotational movement rx about the axis x has nothing to do with the ability to follow the rail 6 but should be controlled for improvement of riding comfort on the travelling body.

FIGS. 5 to 8 show by way of example the structural arrangement of an independent suspension system that meets the requirements for such a mobility of the module 1. A brief description of the suspension system is as follows.

Link mechanisms $9_1$ and $9_2$ are arranged to link the front and rear parts of each module 1 to the travelling body 8. Each of the link mechanisms $9_1$ and $9_2$ consists of five links which are connected to one another by pin joints to form two parallelograms and which are arranged to allow the module 1 to make its movements dy and dz in the direction of the axes y and z relative to the travelling body 8. In addition to this, these link mechanisms $9_1$ and $9_2$ are thus arranged to be mobile independently of each other to permit the module 1 to make the rotational movements ry and rz about the axes y and z. However, the rotational movement rx of the module 1 about the axis x is restrained by these link mechanisms $9_1$ and $9_2$.

Between each module 1 and the travelling body 8, there are provided two thrust links 10 which form a propulsion transmitting device and are pivotally attached at one end to the front and rear ends of each module 1 by ball end joints. The other end of each of the thrust links 10 is pivotally connected also by a ball end joint to a mounting member 14 which is attached to the travelling body 8. The two thrust links 10 are arranged to form a triangle approximately within a horizontal plane as shown in the drawing with each pivotal connection point supported by a ball end joint. This arrangement of the thrust links 10 permits the above stated two movements dy and dz and the two rotational movements ry and rz of the module 1 relative to the travelling body 1 while the movement of the module 1 in the direction of the axis x is restrained to transmit a propulsive force to the travelling body 8.

Since the movement and rotational movement of the module 1 are restrained by the circular motions of the thrust links 10, it is necessary for practical application of this suspension system to have members such as of hard rubber inserted in the connection parts of the above stated link mechanisms $9_1$ and $9_2$ between the link mechanisms and the travelling body and the module 1 in such a way as to absorb a certain degree of displacement in the direction of the axis x.

Figure 8:
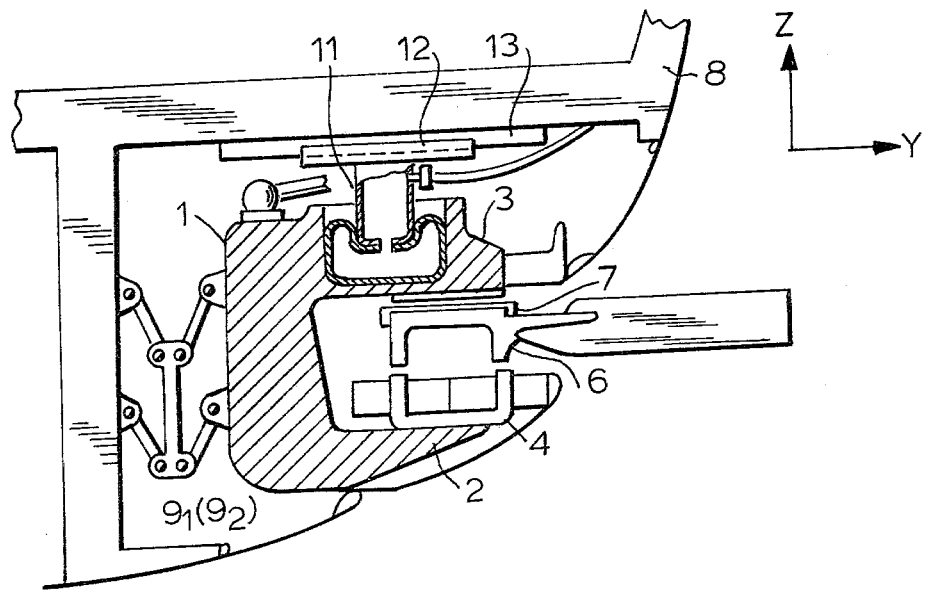
FIG. 8 is a cross sectional front view of the same.
Figure 9:
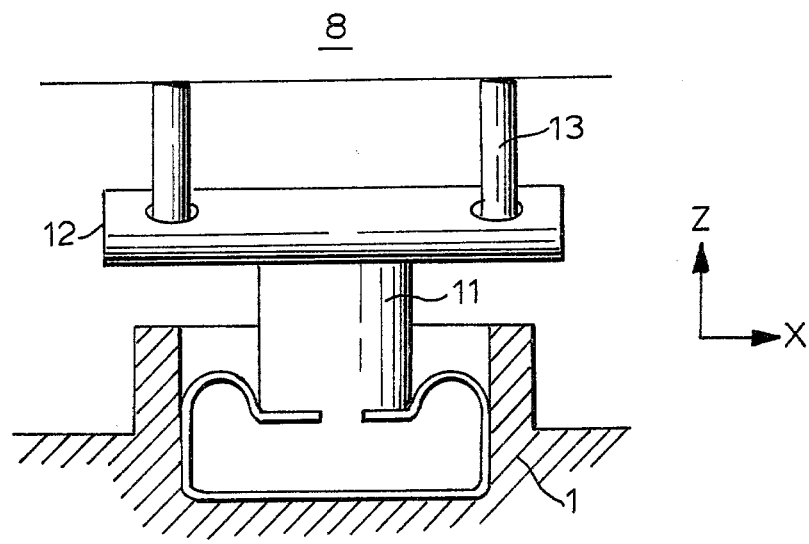
FIG. 9 is an enlarged sectional view showing an air spring.

Further, in association with this arrangement, there are provided a pair of buffer devices comprising air springs 11 which are separately arranged in the front and rear parts of each module 1 and between the module and the travelling body 8 to support the weight of the travelling body as buffer devices. A mounting member 12 which is provided for attaching each of the air springs 11 to the travelling body 8 is arranged to freely make the above stated movement dy in the direction of the axis y within a certain range. To permit this movement dy of the air spring 11, sliding mechanism 13 such as a linear bearings or the like are arranged, for example, as shown in FIGS. 8 and 9.

Figure 10:
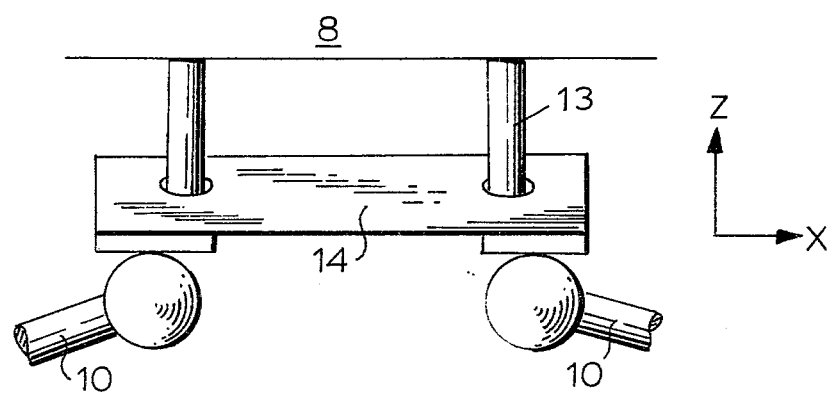
FIG. 10 is an enlarged view showing the structural arrangement of a propulsion transmitting device.

In order to permit the movements dy and dz of the module 1 in the directions of axes y and z, the mounting member 14 to which the two thrust links 10 are pivotally connected must be arranged to be movable in the direction of the axis y relative to the travelling body 8. Therefore, in this particular embodiment of the invention, the mounting member 14 is attached to the travelling body 8 through a sliding mechanism 13 in the same way as the air springs, as shown in FIG. 10.

As described in the foregoing, in the independent suspension system of the present invention for an attraction type magnetically floated travelling body, each module which has one or a plurality of electromagnets secured thereto is allowed to make the above stated movements dy and dz in the directions of the axes y and z and also the rotational movements ry and rz about the axes y and z for the purpose of improving the ability of the module to follow the rail on which it is positioned. In relation to this structural arrangement, there are provided buffer devices which are arranged between the module and the travelling body to support the weight of the travelling body and to perform a buffering action by means of air springs, and a propulsion transmitting device which is arranged to transmit a propulsive force by means of two thrust links. With these devices arranged and connected, the capability of each module to follow the rail during high speed travel of the travelling body can be enhanced. This is a great advantage of the present invention.

In the foregoing, the use of air suspension has been described. However, it will be clearly understood that shock absorbers can be also arranged in the same manner in combination with the air suspension arrangement.

What is claimed is:

1. In an attraction type magnetically floated travelling vehicle of the type including a travelling body adapted to move along a pair of rails, a plurality of modules suspendedly mounted on said body at positions to confront said rails, each said module having elecromagnet means for floating said modules and said body with respect to said rails, motive means on each said module for moving said modules and said body along said rails, and suspension means for connecting each of said modules to said body, the improvement wherein said suspension means includes, for each said module:

first and second buffer devices connected to said module at front and rear ends thereof, respectively, each said buffer device including a lower end immovably attached to an upper part of said module and an upper end;

first mounting members attached to an undersurface of said body for movement therealong in opposite directions laterally of the longitudinal direction of movement of said body along said rails, said upper end of each said buffer device being fixed to a respective said first mounting member, such that said buffer devices and said module are movable relative to said body in said opposite lateral directions;

first and second thrust links, each said thrust link having first and second ends, said first ends of said first and second thrust links being pivotally connected to said upper part of said module adjacent said front and rear ends thereof, respectively, said first and second thrust links extending from said pivoted first ends thereof substantially symmetrically toward a central portion of said module; and a second mounting member attached to said undersurface of said body for movement therealong in said opposite lateral directions, said second ends of said first and second thrust links being pivotally connected to said second mounting member, such that said thrust links and said module are movable relative to said body in said opposite lateral directions and in opposite vertical directions.

2. The improvement claimed in claim 1, wherein each said mounting member is slidably guided for movement in said opposite lateral directions by a respective guiding mechanism fixed to said undersurface of said body.

3. The improvement claimed in claim 1, further comprising linking means pivotally fixed to each side of said body and to a respective said module for enabling said module to move relative to said body in said opposite lateral and opposite vertical directions.

4. The improvement claimed in claim 1, wherein said first and second thrust links together form a substantially V-shaped configuration.

5. The improvement claimed in claim 1, wherein said buffer devices comprise air springs.

* * * * *